(12) United States Patent
Haroun et al.

(10) Patent No.: US 9,993,743 B2
(45) Date of Patent: Jun. 12, 2018

(54) DISTRIBUTOR TRAY FOR GAS/LIQUID CONTACT COLUMN WITH SECONDARY DISTRIBUTION SYSTEM

(71) Applicant: IFP Energies nouvelles, Rueil-Malmasion (FR)

(72) Inventors: Yacine Haroun, Davis, CA (US); Aude Royon-Lebeaud, Lyons (FR); Cecile Plais, Les Haies (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 68 days.

(21) Appl. No.: 14/896,713

(22) PCT Filed: May 19, 2014

(86) PCT No.: PCT/FR2014/051151
§ 371 (c)(1),
(2) Date: Dec. 8, 2015

(87) PCT Pub. No.: WO2014/199035
PCT Pub. Date: Dec. 18, 2014

(65) Prior Publication Data
US 2016/0107099 A1    Apr. 21, 2016

(30) Foreign Application Priority Data

Jun. 10, 2013 (FR) .................................. 13 55307

(51) Int. Cl.
*B01D 3/00* (2006.01)
*B01D 3/32* (2006.01)
*B01D 53/18* (2006.01)

(52) U.S. Cl.
CPC ............. *B01D 3/324* (2013.01); *B01D 3/008* (2013.01); *B01D 53/185* (2013.01)

(58) Field of Classification Search
CPC ....... B01D 3/008; B01D 3/324; B01D 53/185
USPC .......................................... 261/97, 110, 114.5
See application file for complete search history.

(56) References Cited

U.S. PATENT DOCUMENTS

| | | | | |
|---|---|---|---|---|
| 3,446,489 A | * | 5/1969 | Leva | B01D 3/008 261/113 |
| 3,524,731 A | | 8/1970 | Effron et al. | |
| 4,427,605 A | * | 1/1984 | Meier | B01D 3/20 202/158 |
| 4,808,350 A | | 2/1989 | Robbins et al. | |
| 5,013,491 A | * | 5/1991 | Nutter | B01D 53/185 261/97 |

(Continued)

OTHER PUBLICATIONS

International Search Report for PCT/FR2014/051151 dated Sep. 18, 2015; English translation submitted herewith (6 pages).

*Primary Examiner* — Charles Bushey
(74) *Attorney, Agent, or Firm* — Fitch, Even, Tabin & Flannery LLP (57) ABSTRACT

The invention is a distributor tray (2) of a column for heating and/or material exchanging material between a gas and a liquid, comprising gas passage casings (4), liquid passages (6) and a secondary distribution system (7) projecting from the lower part of tray (2). Secondary distribution system (7) allows the liquid to be collected and distributed more homogeneously over the contactor. The invention also relates to a gas/fluid heat or material exchange column comprising such a distributor tray.

13 Claims, 7 Drawing Sheets

(56) References Cited

U.S. PATENT DOCUMENTS

| | | | | |
|---|---|---|---|---|
| 5,224,351 A * | 7/1993 | Jeannot | B01D 3/008 165/166 |
| 5,232,283 A * | 8/1993 | Goebel | B01F 3/04496 261/113 |
| 5,484,578 A * | 1/1996 | Muldowney | B01D 3/008 261/113 |
| 5,752,538 A * | 5/1998 | Billingham | B01D 3/008 137/1 |
| 6,568,663 B1 * | 5/2003 | Xu | B01D 3/20 261/114.1 |
| 6,783,120 B2 * | 8/2004 | Shakur | B01D 3/20 261/114.1 |
| 7,232,115 B2 * | 6/2007 | Sastry | B01D 3/20 202/158 |
| 7,234,692 B2 * | 6/2007 | Dichtl | B01D 3/008 261/114.2 |
| 7,901,641 B2 * | 3/2011 | Kumar | B01J 8/025 210/137 |
| 8,205,863 B2 * | 6/2012 | Monkelbaan | B01D 3/008 261/113 |
| 8,246,017 B2 * | 8/2012 | Xu | B01D 3/20 261/108 |
| 8,517,353 B2 * | 8/2013 | Bannon | B01D 3/205 261/110 |
| 8,695,953 B2 * | 4/2014 | Xu | B01D 3/008 261/110 |
| 9,011,790 B2 * | 4/2015 | Iselborn | B01J 8/008 261/108 |
| 2001/0038155 A1 * | 11/2001 | Bachmann | B01D 3/008 261/97 |
| 2003/0011085 A1 * | 1/2003 | Bosmans | B01D 3/20 261/114.5 |
| 2008/0053814 A1 | 3/2008 | Monkelbaan | |
| 2010/0244290 A1 | 9/2010 | Xu | |
| 2011/0303089 A1 | 12/2011 | Xu | |

* cited by examiner

DISTRIBUTOR TRAY FOR GAS/LIQUID CONTACT COLUMN WITH SECONDARY DISTRIBUTION SYSTEM

CROSS REFERENCE TO RELATED APPLICATION

Reference is made to PCT Application No. PCT/FR2014/051151 and French Patent Application No. 13/55,307 which are incorporated herein by reference in their entirety.

BACKGROUND OF THE INVENTION

Field of the Invention

The present invention relates to the field of gas/liquid contact columns, and more particularly for gas treatment, $CO_2$ capture or distillation units.

Description of the Prior Art

Gas treatment and/or $CO_2$ capture units using amine wash processes and/or distillation units comprise columns for material and/or heat exchange between a gas and a liquid. They can be for example are liquid or gaseous fluid absorption and regeneration columns. These columns operate under counter-current or co-current gas/liquid flow conditions.

Figure 1:
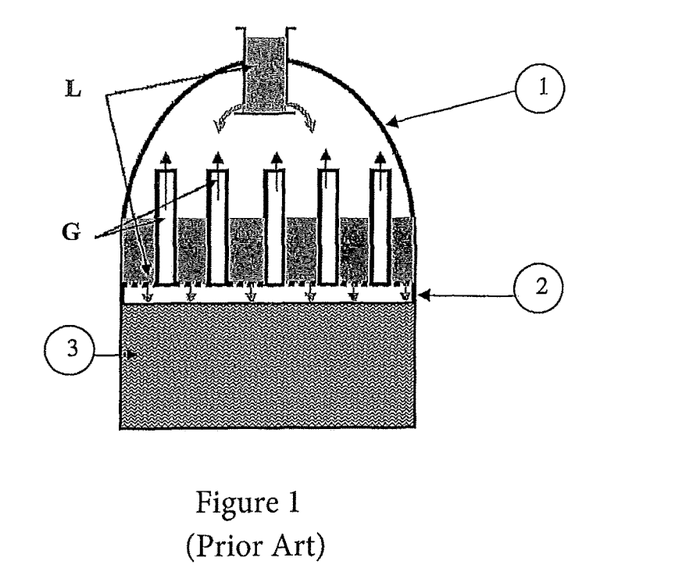
FIG. 1, already described, illustrates the particular case of a gas treatment or $CO_2$ capture column top equipped with a distributor tray.

The columns used in these gas treatment and/or $CO_2$ capture and/or distillation and/or dehydration units generally operate on the principle of material and/or heat exchange between the gas and the fluid that circulate in the columns. FIG. 1 shows a particular case of a gas treatment column top (1) equipped with a distributor tray. Conventionally, this gas treatment column (1) comprises several sections (3) filled by a contactor with a distributor tray (2) arranged above each section (3). The gas/liquid contactor contacts gas (G) with liquid (L) to allow exchanges.

Figure 2:
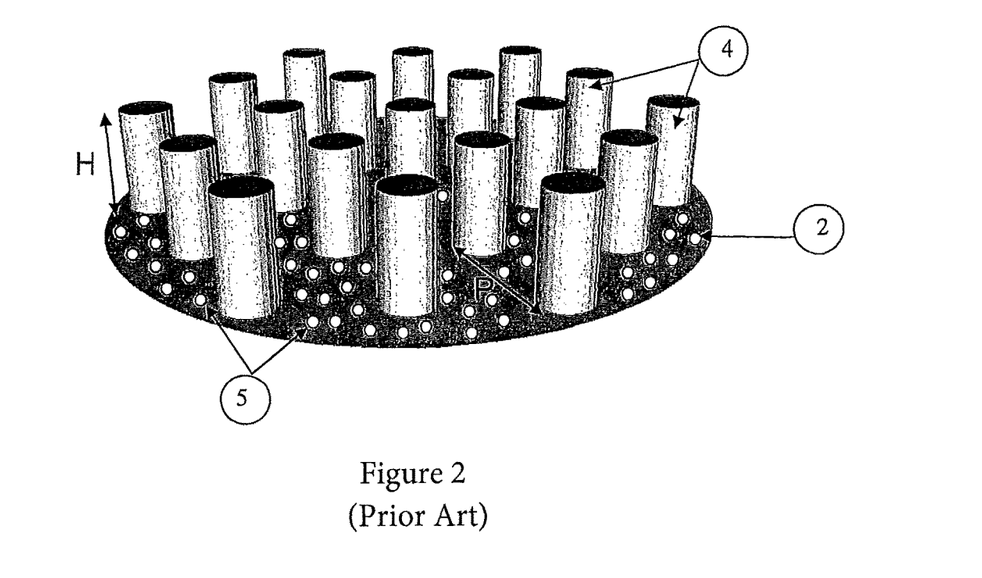
FIG. 2, already described, illustrates a distributor tray according to the prior art.

For example, standard distributors (2) used in absorption/regeneration or distillation columns generally have a collector/distributor tray equipped with chimneys (4) or gas passage casings (see FIG. 2). Distribution of the liquid occurs through passage thereof through orifices (5) positioned in the lower part of tray (2) and distribution of the gas occurs through casings (4). Each casing (4) allows passage of the gas, according to the counter-current or co-current operating mode, from the lower part of the column to the upper part of column (1), or from the upper part to the lower part. Casings (4) project from one side of tray (2) and they are perpendicular thereto. Each casing (4) has several walls which are parallelepipedic or cylindrical in shape for example, which define an inner volume that is open on either side of tray (2). In order to prevent the liquid from flowing into casings (4), the gas outlet or inlet opening above the tray (according to the counter-current or co-current mode) is preferably covered by a cap (also referred to as bevel). The purpose of the distributor tray is to distribute liquid (L) homogeneously onto gas/liquid contactor (3).

In order to optimize exchanges between gas and liquid, many distributor trays have been developed. These distributor/collector trays can be classified into two main families which are:

Distributor/collector systems with chimneys, as described in GB Patent Application 1,169,878A, U.S. Pat. Nos. 4,808,350, 4,472,325, 4,427,605 and 4,839,108, and French Patent Application 2,203,659. For this type of system with chimneys, the liquid is distributed via orifices provided on the tray or via liquid passage chimneys equipped with orifices or slots (see example of FIG. 2), and the gas is distributed through gas passage chimneys or casings. Distribution of the liquid through orifices provided on the tray or by liquid passage chimneys does not obtain homogeneous distribution of the liquid on the contactor without a large number of orifices or chimneys, which however leads to a complex and heavy tray having a large number of liquid passage chimneys, Systems with distributor casings provided with a dedicated feed system (upstream collecting system or intermediate feed), are described in U.S. Pat. Nos. 4,909,967, 4,816,191, and 4,981,265, German Patent 2,752,391, WO-8,802,647, and French Patent 2,569,129, or distributor/collector systems with gas passage casings are described in U.S. Pat. Nos. 4,689,183, 5,132,055, and 4,432,913. These distributor types are most often provided with liquid distribution systems arranged on gas passage casings.

However, liquid distribution systems requiring a dedicated feed system are often very bulky due to the presence of a collector upstream from these distributors. Furthermore, these liquid distribution systems do not allow homogeneous distribution of the liquid on the contactor. Moreover, the shape of some gas passage casings generates high pressure drops, which limit the efficiency of the column.

Most often, the systems described in the prior art do not provide sufficient distributor tray flexibility. The flexibility of a distributor tray is defined by its capacity to provide good liquid distribution, for low fluid (liquid or gas) flow rates as well as higher fluid flow rates. A distributor tray with high flexibility can be used by varying the operating conditions (notably the flow rates) of the material and/or heat exchanges between the fluids, in order to improve exchange efficiency or to adapt to the fluids being used. Indeed, these operating conditions can be very variable are for example, the liquid spray rate (liquid flow rate against the surface area of the column) can range from 5 to 120 $m^3/m^2/h$, the gas kinetic factors (root of the gas inertia built on the superficial gas velocity) can range from 0.5 to 4 $Pa^{1/2}$ and the ratio of the nominal flow rate to the turndown (minimum operating flow rate of the column) can range between 1 and 5-6. That the columns can have diameters of between 1 and 10 m.

In order to provide homogeneous distribution of the liquid, distributors in the form of sprinklers disclosed in U.S. Pat. No. 4,776,989, have been developed. However, this type of distributor exhibits limited flexibility and requires being associated with a collecting device to be used as an interbed distributor.

SUMMARY OF THE INVENTION

The invention relates to a distributor tray of a column for material and/or heat exchange between a gas and a liquid, comprising gas passage casings, liquid passages and a secondary distribution system. The secondary distribution system allows collection of the liquid and its distribution more homogeneously over the contactor. Thus, the distributor tray according to the invention obtains, in a less complex manner, good distribution of the liquid, to limit pressure drops and to have good tray flexibility.

The invention relates to a distributor tray for a column used for heat and/or material exchange between a gas and a liquid, comprising at least one casing projecting from the upper part of the tray for passage of the gas through the tray and at least one passage for passing of the liquid through the tray. The tray furthermore comprises at least one secondary distribution system projecting from the lower part of the tray for distributing the liquid coming from the at least one liquid passage for the liquid.

According to the invention, the secondary distribution system now has at least one perforated casing.

Advantageously, the perforated casing comprises several perforations.

Preferably, each perforated casing substantially is shaped as a trough.

Advantageously, the perforated casing has a cross-section and a longitudinal section of substantially trapezoidal or rectangular shape respectively with the longest side of the sections being located on the side of the tray.

According to one embodiment of the invention, the perforated casing comprises liquid passage tubes.

At least part of the tubes can project inside the perforated casing.

Besides, at least part of the tubes can project outside the perforated casing.

Furthermore, at least part of the tubes projecting outside the perforated casing can be inclined.

In a variant, at least part of the tubes projecting outside the perforated casing have a bevelled end or cap.

According to the invention, the distribution system comprises perforated casings arranged in opposite zones that do not include the gas passage casing.

Advantageously, the gas passage casing is substantially parallelepipedic in shape.

Preferably, the tray comprises gas passage casings, which are parallel to one another.

According to an embodiment of the invention, the liquid passages comprise at least one chimney projecting from the upper part of the tray. Each chimney comprises at least one radial orifice for inflow of the liquid and an opening for guiding or channeling the liquid onto the secondary distribution system.

Advantageously, the chimney comprises at least two radial orifices arranged at different heights with respect to the upper surface of the tray.

Alternatively, the passages for the liquid comprise a lateral orifice in the gas passage casing and a liquid flow path allowing the liquid to flow from the gas passage casing to the secondary distribution system.

The invention also relates to a column for heating and/or material exchange between a gas and a liquid, wherein the two fluids are contacted by a contactor. The column comprises at least one distributor tray according to the invention, allowing distribution of the fluids onto the contactor.

According to the invention, the column also comprises at least one divider arranged above a distributor tray for distribution of the liquid over the distributor tray. The divider is perforated for passage of the liquid and comprises at least one raised perforation for passage of the fluid.

The invention also relates to the use of a column according to the invention for a gas treatment, $CO_2$ capture, distillation or air conversion method.

BRIEF DESCRIPTION OF THE DRAWINGS

Other features and advantages of the device according to the invention will be clear from reading the description hereafter of embodiments given by way of non-imitative example, with reference to the accompanying figures wherein:

FIGS. 7a) to 7e) illustrate different variants of the secondary distribution system of the tray according to the invention;

DETAILED DESCRIPTION OF THE INVENTION

Figure 3:
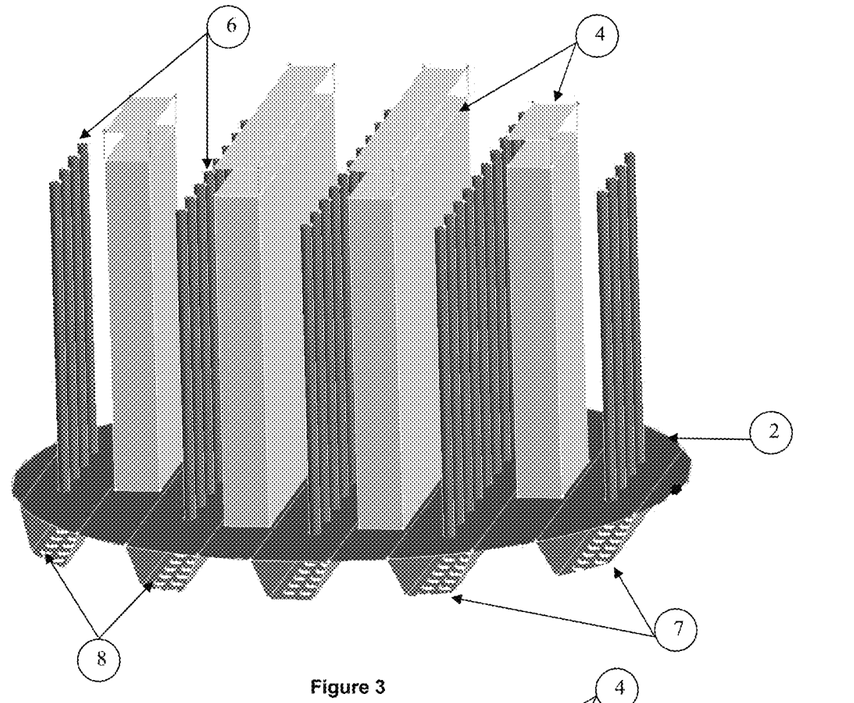
FIG. 3 illustrates a distributor tray according to a first embodiment of the invention.
Figure 4:
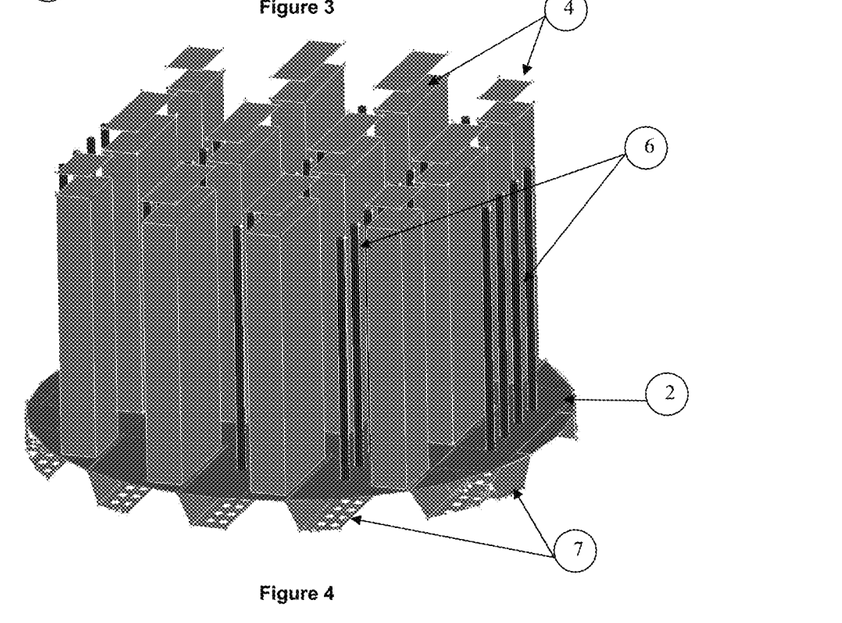
FIG. 4 illustrates a distributor tray according to a variant of the first embodiment of the invention.

FIGS. 3 and 4 illustrate a first embodiment of a distributor tray according to the invention.

The invention relates to a distributor tray (2) for a column (1) for heat and/or material exchange between a gas (G) and a liquid (L), conventionally comprising at least one casing (4) for passage of the gas through the tray, at least one passage of the liquid, such as a chimney (6), through tray (2) and at least one secondary distribution system (7). Distributor tray (2) allows formation of a liquid guard level on the upper surface thereof. Casing (4) and chimney (5) project from the upper part of tray (2) (oriented towards the top of the column), whereas secondary distribution system (7) projects from the lower part of tray (2) (oriented towards the bottom of the column). Distribution system (7) is referred to as secondary in relation to the liquid passage that is considered to be the main (or primary) distribution system.

Gas passage casing (4) provides a column operating in counter-current mode with passage of the gas from the underside to the top side of the tray. Advantageously, gas passage casing (4) has a substantially parallelepipedic shape, to provide a wide opening for passage of the gas and to limit pressure drops. Furthermore, when distributor tray (2) comprises several gas passage casings (4), they can be arranged parallel to one another. According to the variant embodiment of FIG. 3, gas passage casings (4), which are four in number, have variable sizes and they only define parallel spaces between them on the tray. According to the variant embodiment of FIG. 4, gas passage casings (4), which are twelve in number, have substantially identical sizes and they define parallel and orthogonal spaces on the tray. These examples are not exhaustive of the possible implementations of gas passage casings (4). Gas passage casings (4) are preferably covered with a cap (also referred to as bevel) for preventing the liquid from flowing into the casings.

The liquid passages (6) allow passage of the liquid from the top to the underside of the tray. According to the embodiment of FIGS. 3 and 4, the liquid passages allows passage of the liquid through the tray and are a set of chimneys (6). The chimneys (6), which are of substantially tubular shape, are arranged between gas passage casings (4). The number of chimneys (6) is advantageously larger than the number of gas passage casings (4). The pitch of liquid passage chimneys (6) can be triangular or square.

Figure 6:
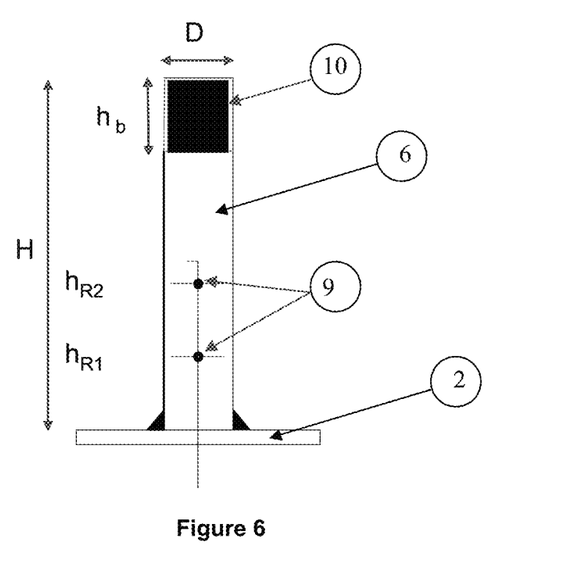
FIG. 6 shows a liquid chimney for the first embodiment.

FIG. 6 is an example of a chimney (6) that can be used for this embodiment. Height H of chimney (6) is smaller than the height of gas passage casings (4). For example, a chimney (6) can be 600 mm high and a casing (4) can be 700 mm high. In order to prevent liquid from flowing into gas passage casings (4) when the liquid guard height is great, the chimney is provided with an opening (10). Furthermore, chimney (6) has a cap (or bevel) for preventing liquid from flowing directly into chimney (6). Chimney (6) comprises at least one and preferably, as shown, two radial orifices (9) for inflow of the liquid into the chimney. The liquid is conveyed by gravity beneath the tray. Preferably, when chimney (6) comprises at least two radial orifices (9), they are provided at different heights: $h_{R1}$ and $h_{R2}$. Thus, when the liquid flow rate is low, the liquid guard height on the tray (height of liquid in relation to the tray level) is low and only the first radial orifice allows liquid to flow through the tray. When the liquid flow rate is higher, the liquid guard height increases, and the first and second radial orifices allow the liquid to flow through the tray. Due to this characteristic, the distributor tray is suited to various flow rates, and is therefore flexible.

Furthermore, the distributor tray according to the invention comprises at least one secondary distribution system (7) projecting from the lower part of the tray. Secondary distribution system (7) allows distribution of the liquid coming from the liquid passage through the tray over a contactor (3) arranged beneath tray (2) in an evenly distributed manner. According to one embodiment of the invention, the secondary distribution system has at least one perforated casing (7) arranged below tray (2). Perforated casing (7) allows collection of the liquid coming from the liquid passage through the tray and perforations (8) of this casing (7) provide homogeneous distribution of the liquid. For example, two rows of perforations (8) are provided in each perforated casing (7), Perforated casings (7) are positioned opposite the passage of the liquid through tray (2), opposite chimneys (6) according to the embodiment of FIGS. 3 and 4, and not opposite gas passage casings (4), notably in order to allow free passage of the gas.

Figure 5:
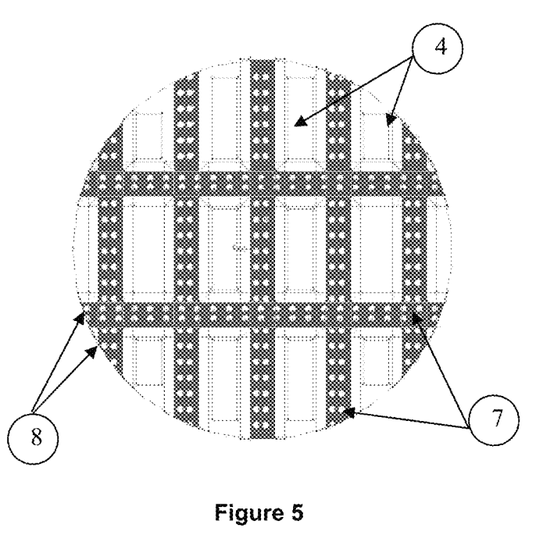
FIG. 5 is a bottom view of the distributor tray of FIG. 4.

FIG. 5 illustrates a bottom view of a distributor tray according to the invention where this alternation of perforated casings (7) and gas passage casings (4) can be seen. Perforations (8) allow increasing the density of the distributor injection points and thus to improve the distribution quality. A larger surface area of the packing bed beneath the distributor is thus wetted with this distribution system in relation to a conventional system. This concept also allows reduction of the embodiment complexity by decreasing the number of chimneys present on the distributor tray, which also allows reduction of the size and the weight of the distributor tray.

Figures 7A, 7B:
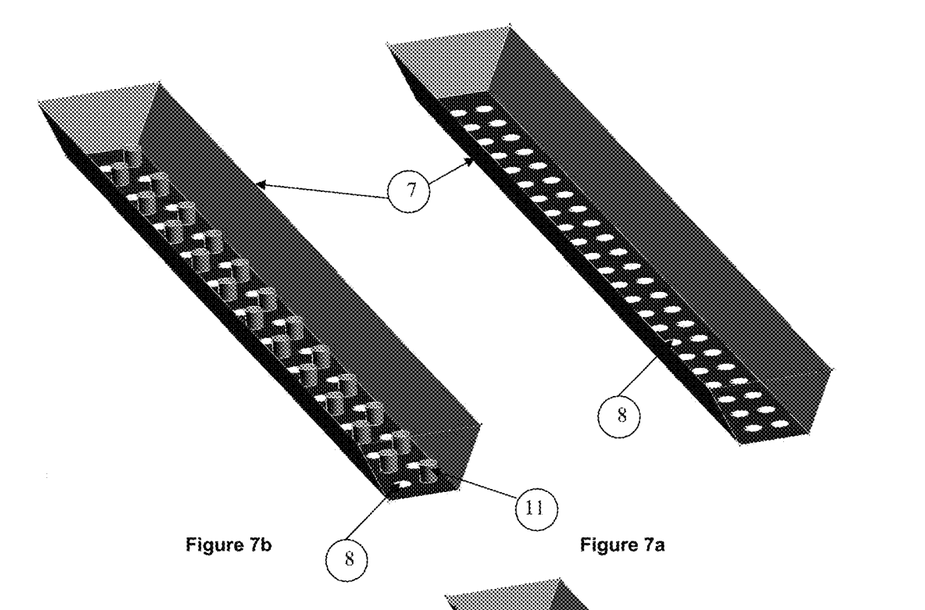
Figures 7C, 7D:
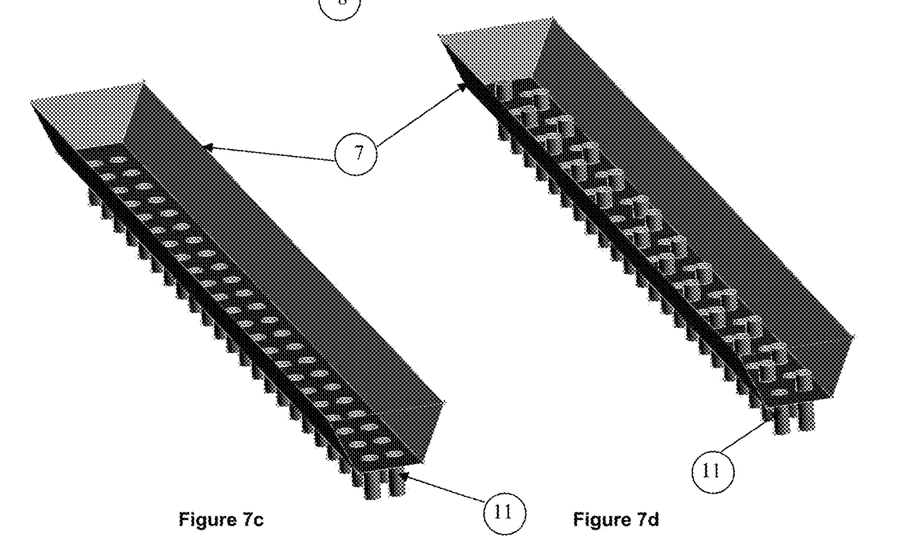
Figure 7E:
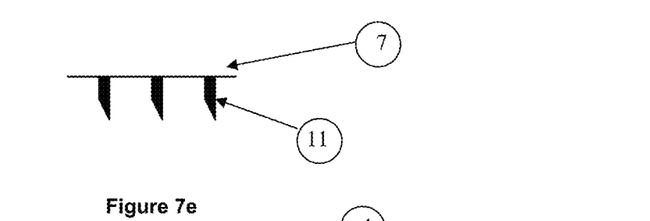

Advantageously, to achieve this collection, perforated casing (7) is substantially in the shape of a trough. Preferably, as shown in FIG. 7, this trough has a substantially trapezoidal or rectangular cross-section with the longest side in the upper part, on the side of tray (2). Moreover, the trough has a substantially trapezoidal or rectangular longitudinal section with the longest side thereof in the upper part, on the side of tray (2). The trapezoidal shape of the distribution trough prevents liquid from being carried into gas passage casings (4) while minimizing gas acceleration locally.

FIGS. 7a) to 7e) show different variant embodiments of perforated casings (7).

According to the embodiment of FIG. 7a), perforated casing (7) only comprises perforations (8).

According to the embodiments of FIGS. 7b) to 7d), casing (7) comprises tubes (11) in addition to perforations (8).

According to the embodiment of FIG. 7b), perforated casing (7) comprises both perforations (8) and tubes (11). The tubes (11) project into perforated casing (7) to adapt the porosity of perforated casing (7) to the operating flow rate. The inside of perforated casing (7) is the space defined by perforated casing (7) and tray (2). When the liquid flow rate is low, the liquid guard height in perforated casing (7), which is the height of liquid in relation to the bottom of the casing, is low. Only perforations (8) allow the liquid to flow through the casing. When the liquid flow rate is higher, the liquid guard height increases and both perforations (8) and tubes (11) allow the liquid to flow through perforated casing (7). This device permits maintaining an excellent distribution over the entire flow rate range and. This characteristic allows, the distributor tray to be suited to various flow rates, and thus provides flexibility.

According to the embodiment of FIG. 7c), perforated casing (7) comprises tubes (11) projecting outside perforated casing (7). The outside of perforated casing (7) is the space beneath perforated casing (7). The tubes allow the liquid stream to be oriented. For this orientation, the projecting tubes can be inclined to send the fluid onto the entire contactor (3). Furthermore, outer tubes (11) allow more liquid to be carried along by offsetting the liquid outlet with respect to the gas acceleration zone.

The embodiment of FIG. 7d) combines the embodiments of FIGS. 7b) and 7c), with tubes (11) projecting outside and, for some of them, also inside perforated casing (7).

As shown in FIG. 7e), tubes (11) projecting outside perforated casing (7) can be bevelled to improve the quality of the jet coming from distribution tubes (11).

Using such tubes (11) projecting inside and/or outside, bevelled or not, can occupy only part or all of perforations (8) of casing (7). For higher flexibility, tubes (11) projecting inside with different heights can be used.

The invention also relates to a column (1) for material and/or heat exchange between two fluids, wherein two fluids are contacted by a gas/liquid contactor (3), column (1) comprising at least a first inlet for a liquid fluid, at least a second inlet for a gaseous fluid, at least a first outlet for a gaseous fluid and at least a second outlet for a liquid fluid. Column (1) also comprises a distributor tray (2) as described above, allowing distribution of the fluids onto contactor (3).

Advantageously, gas/liquid contactor (3) is a stacked or a random packed bed.

Figure 8A:
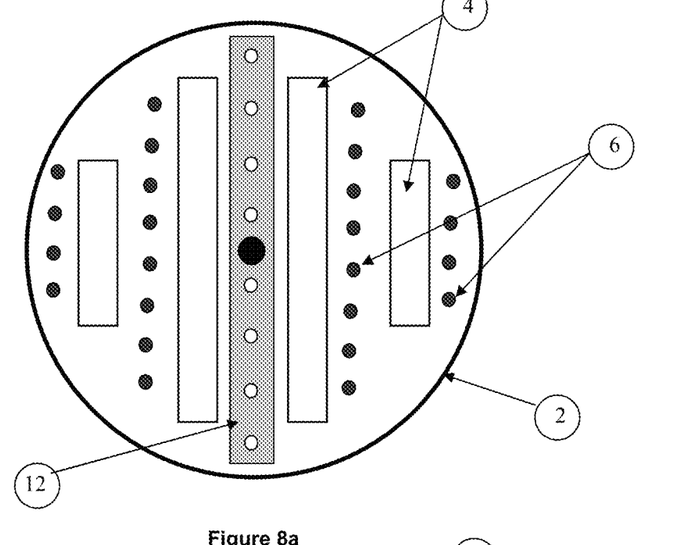
FIGS. 8a) and 8b) show a top view of a tray according to the invention above which a divider according to the invention is positioned.
Figure 8B:
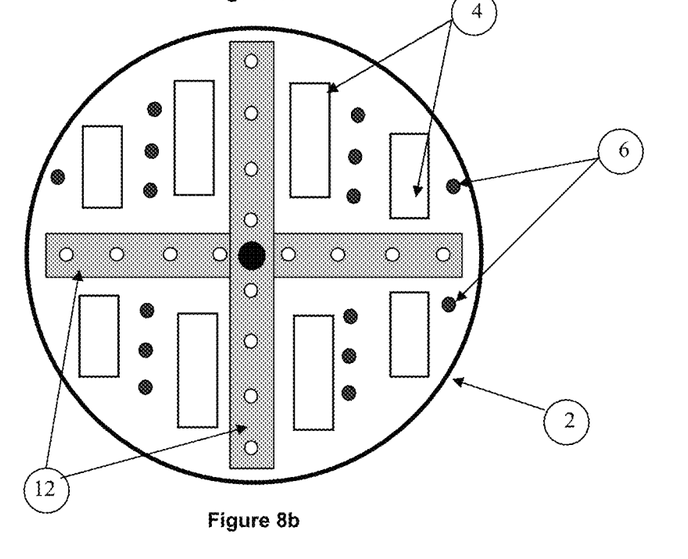
Figure 9:
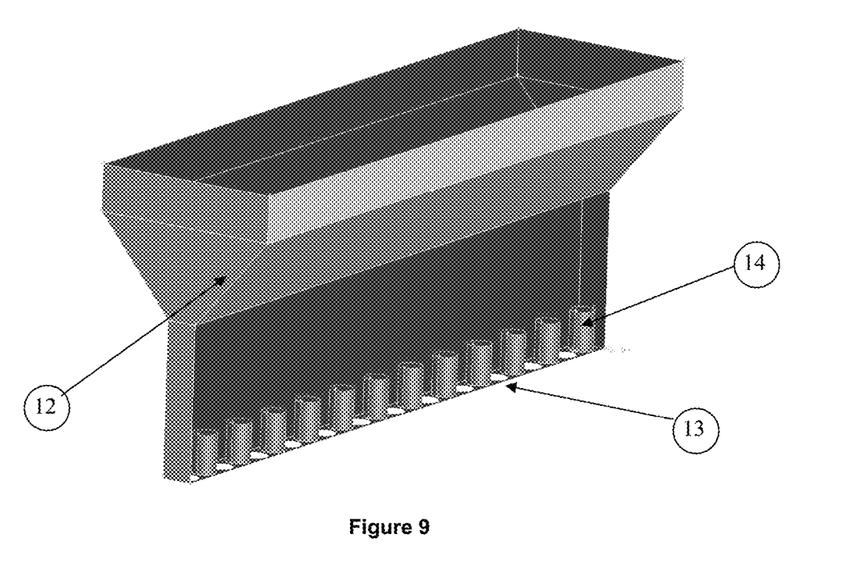
FIG. 9 shows an embodiment of a divider according to the invention.

In the particular case where the distributor is positioned at the top of column (1), a divider (12) is arranged above distributor tray (2) (FIGS. 8a) and 8b)). The purpose of divider (12) is, on the one hand, to break the inertia of the jet coming from the delivery line at the column inlet and, on the other hand, to provide good distribution of the liquid in the collection space of distributor tray (2). Divider (12) is made up of a downcomer and of a collection and distribution space. Divider (12) is equipped with a row of holes (13) through which the liquid is distributed over the distributor tray and shown in FIG. 9. According to a variant embodiment of the invention, some holes (14) are raised so as to adapt the porosity of the divider to the operating flow rate. This concept is particularly suited for columns operating with a wide liquid flow rate variation range high ratio between the minimum and maximum operating flow rate. The device thus maintains a good distribution of the liquid over distributor tray (2) for a wide liquid flow rate range.

The column according to the invention can be used in gas treatment, $CO_2$ capture, distillation or air conversion methods.

Variant Embodiment

Figure 10A:
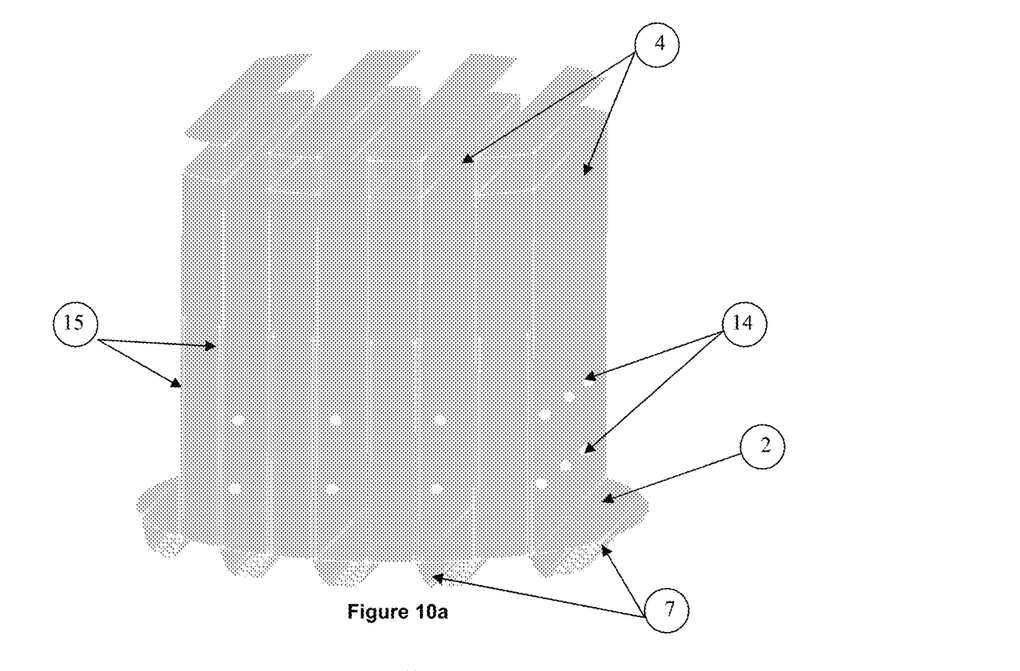
FIG. 10 illustrate a distributor tray according to a second embodiment of the invention.
Figure 10B:
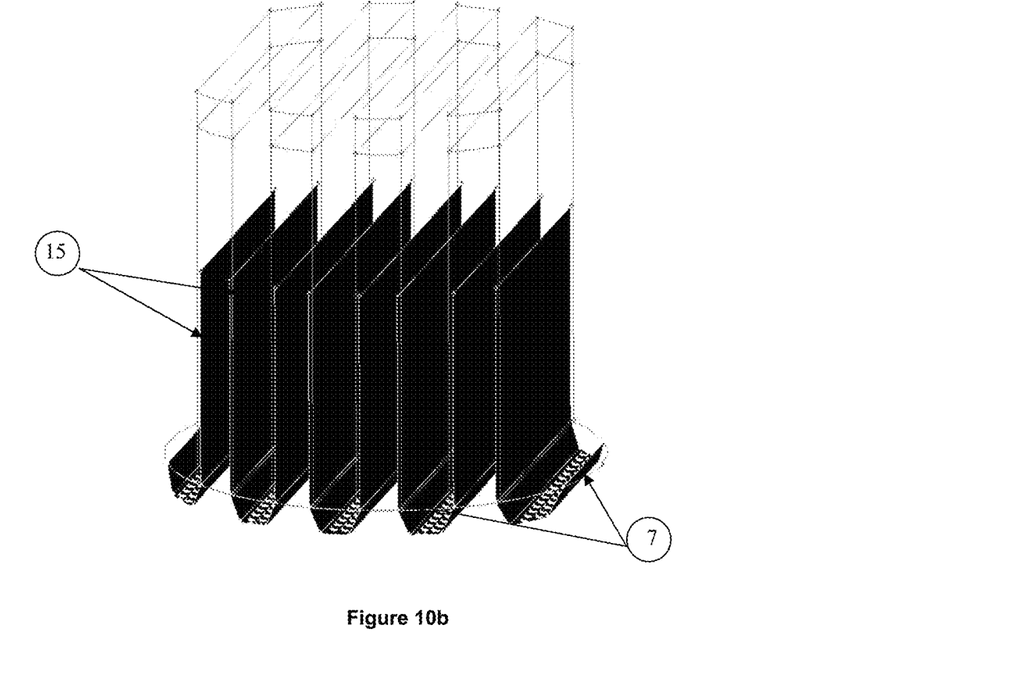

According to a second embodiment of the invention illustrated in FIGS. 10*a*) and 10*b*), the passage of the liquid through tray (2) is made up of lateral orifices (14) on gas passage casing (4) and of a liquid flow (15) allowing the liquid to flow from gas passage casing (4) to secondary distribution system (7). This liquid flow (15) is inserted in gas passage casing (4) and it extends into the secondary distribution system (7). Advantageously, this liquid flow (15) has f a plate covering the wall comprising the lateral orifices of casing (4). The liquid thus flows between the plate and gas passage casing (4), and passes into secondary distribution system (7).

The invention claimed is:

1. A distributor tray for providing at least one of a heat and material exchange between a gas and a liquid comprising: at least one casing projecting from an upper part of the tray for passing the gas through the tray, at least one passage for passing the liquid through the tray, and at least one secondary distribution system projecting downward from a bottom side of the tray for distributing the liquid passing through the tray from the at least one passage for passing the liquid through the tray, the at least one secondary distribution system including at least one casing with a trough with bottom holes or with tubes for uniformly distributing the liquid and a top of the trough being aligned with at least one passage for passing the liquid through the tray and the trough having a cross-section and a longitudinal section which is trapezoidal or rectangular in shape, the trough contacting the bottom side of the tray and the at least one casing for passing the gas through the tray is not coupled to the trough to prevent the liquid from being transported from the trough into the at least one casing for passing gas through the tray.

2. A tray as claimed in claim 1, wherein the trough comprises bottom holes for passing the liquid.

3. A tray as claimed in claim 1, wherein the trough comprises tubes for passing the liquid.

4. A tray as claimed in claim 3, wherein at least part of the tubes for passing the liquid projects inside the trough.

5. A tray as claimed in claim 3, wherein at least part of the tubes for passing the liquid projects outside the trough.

6. A tray as claimed in claim 5, wherein at least part of the tubes projecting outside the trough is inclined.

7. A tray as claimed in claim 5, wherein at least part of the tubes projecting outside the trough has a bevelled end.

8. A tray as claimed in claim 1, wherein the distribution system comprises perforated casings located opposite zones of the tray that are not coupled to the casing for passing the gas.

9. A tray as claimed in claim 1, wherein the gas passage casing has a parallelepipedic shape.

10. A tray as claimed in claim 1, wherein the tray comprises gas passage casings, which are parallel to one another.

11. A tray as claimed in claim 1, wherein the at least one passage for passing the liquid comprises at least one chimney projecting from the upper part of the tray which comprises at least one radial orifice for inflow of the liquid and an opening for transferring the liquid to the at least one secondary distribution system.

12. A tray as claimed in claim 11, wherein the at least one chimney projecting from the upper part of the tray comprises at least two radial orifices disposed at different heights relative to an upper surface of the tray.

13. A tray as claimed in claim 1, wherein a flow path for the liquid comprises a lateral orifice in the at least one gas passage casing through which the liquid flows from the gas passage casing to the at least one secondary distribution system.

* * * * *